UNITED STATES PATENT OFFICE.

JOHN LEWIS SAMUELS, FOR HIMSELF, AND BENJAMIN F. JOSSELYN, WILLIAM B. LAKE, GEORGE G. BURNETT, HENRY S. DENT, MARY A. STIRLING, GEORGE W. DENT, JOEL S. JOSSELYN, AND BENJAMIN R. NICKERSON, OF SAN FRANCISCO, CALIFORNIA, AND FREDERICK T. DENT, OF WASHINGTON, DISTRICT OF COLUMBIA, AND HENRY J. STONE, OF NEW YORK, N. Y., ASSIGNEES OF JOHN LEWIS SAMUELS.

IMPROVEMENT IN PRESERVING AND HARDENING WOOD.

Specification forming part of Letters Patent No. 60,794, dated January 1, 1867; Reissue No. 4,158, dated October 18, 1870.

*To all whom it may concern:*

Be it known that I, JOHN LEWIS SAMUELS, of the city of San Francisco, in the county of San Francisco and State of California, have invented a new and useful Method of Preparing and Hardening Wood for the Purpose of Preserving the Same; and I do hereby declare that the following is a full, clear, and exact description thereof.

The nature of my invention consists in injecting into the pores of the wood, first, a solution of sulphate of iron, and afterward a solution of common burnt lime, in the manner hereinafter more particularly described.

I make a solution of sulphate of iron and water, in about the proportions of one-fourth of a pound of the sulphate of iron to each and every gallon of water, and inject the same into the pores of the wood or timber in any of the common or known methods in use by exhaustion and pressure.

I also make a solution of common burnt lime and water, in about the proportions of three-fourths of a pound of lime to each gallon of water, or, in other words, as much lime as the water will hold in solution, and this last-mentioned solution I inject into the wood in like manner as the former. Although these several solutions may be successively injected into the wood, as before stated, in any of the common or known methods in use by exhaustion and pressure, I will here state the method or process which I prefer and have practiced.

I place the wood or timber to be treated in an iron cylinder sufficiently strong to withstand two hundred and fifty pounds hydraulic pressure to the square inch. I then fill the cylinder with steam, thirty pounds pressure, producing a temperature of about 250° Fahrenheit for large timbers, but for small timbers—such as paving-blocks—a less pressure is required, in order to vaporize the sap and natural moisture of the wood and all the constituents of the sap which are soluble in water, and to coagulate the albumen, or such constituents of the sap as are coagulable, but not soluble, and as are capable of acting as ferments to destroy or impair the life of the wood.

After the steam has remained in the cylinder from thirty to forty minutes I apply strong vacuum-pumps, by which I extract all, or nearly all, of the moisture and air remaining in the heated cells or pores of the wood. I then introduce the solution of the sulphate of iron, applying hydraulic pressure, varying from eighty to two hundred and fifty pounds to the square inch, according to the length and condition of the wood being treated, holding the pressure from thirty to sixty minutes, after which I again use the vacuum-pumps to extract the moisture, leaving the insoluble compounds which have been formed with a portion of the solution itself. I then fill the cylinder as before with the solution of lime above described, using hydraulic pressure sufficient to drive the liquid through the heated pores the entire length of the timber being treated.

The effect of the introduction of the solution of lime is, that it combines with the sulphuric acid of the sulphate of iron remaining in the pores of the wood not extracted by the previous process, and the result is to form the insoluble sulphate of lime and protoxide of iron, both of which remain in the pores of and attached to the fiber of the wood, rendering it in a high degree impervious to the influence of wet and dry rot and the attacks of worms and other insects.

What I claim as my invention, and desire to secure by Letters Patent, is—

The method of preparing wood to harden and preserve the same by injecting into the cells and pores thereof successively solutions of sulphate of iron and of common lime, substantially as herein set forth.

JOHN LEWIS SAMUELS.

Witnesses:
C. H. REYNOLDS,
GEO. C. WALLER.